US011516767B2

(12) United States Patent
Gonzalez Escudero et al.

(10) Patent No.: US 11,516,767 B2
(45) Date of Patent: Nov. 29, 2022

(54) NETWORK NODE, USER EQUIPMENT, AND METHODS IN A WIRELESS COMMUNICATIONS NETWORK

(71) Applicant: Telefonaktiebolaget LM Ericsson (PUBL), Stockholm (SE)

(72) Inventors: Alberto Gonzalez Escudero, Linköping (SE); Tobias Ahlström, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/274,222

(22) PCT Filed: Oct. 23, 2018

(86) PCT No.: PCT/SE2018/051083
§ 371 (c)(1),
(2) Date: Mar. 8, 2021

(87) PCT Pub. No.: WO2020/085961
PCT Pub. Date: Apr. 30, 2020

(65) Prior Publication Data
US 2021/0314908 A1 Oct. 7, 2021

(51) Int. Cl.
H04W 64/00 (2009.01)
H04B 17/309 (2015.01)
(52) U.S. Cl.
CPC ........ H04W 64/006 (2013.01); H04B 17/309 (2015.01)
(58) Field of Classification Search
CPC . H04W 64/006; H04W 84/005; H04W 24/10; H04B 17/309; G01S 5/0036; G01S 5/02
See application file for complete search history.

(56) References Cited

U.S. PATENT DOCUMENTS 5,852,630 A * 12/1998 Langberg ............ H04L 27/2647
375/219
7,398,086 B2 7/2008 Morgand et al.
(Continued)

FOREIGN PATENT DOCUMENTS

EP 3101873 A1 * 12/2016 ......... H04B 7/18504

OTHER PUBLICATIONS

NPL (Detecting and Locating Cell Phone Signals from Avalanche Victims Using Unmanned Aerial Vehicles by Victor Wolfe, William Frobe, Vineetha Shrinivasan, Tsung-Yen Hsieh, dated Jun. 9-12, 2015) (Year: 2015).*

(Continued)

Primary Examiner — Siu M Lee
(74) Attorney, Agent, or Firm — Baker Botts, LLP

(57) ABSTRACT

A method performed by a network node for locating a User Equipment (UE) is provided. The network node, the at least one portable network node and UE operate in a wireless communication network. The network node configures (204) the at least one portable network node to broadcast reference signals. The broadcasted reference signals trigger the UE to subsequently measure and report the quality of the respective reference signals to the network node. The network node then receives (205) subsequent measurement reports from the UE. Each measurement report comprises a current quality value of the reference signals sent by the respective at least one portable network node. The network node manages the respective at least one portable network node to approach the position of the UE by: Meanwhile analyzing the subsequent measurement reports, commanding (206) each of the at least one portable network node to move in a direction that is decided based on the analysis of its corresponding subsequent measurement reports one by one upon receiving them. The moving direction is to be (Continued)

performed such that quality values of its corresponding reference signals in subsequent measurement reports are increasing.

15 Claims, 14 Drawing Sheets

(56) References Cited

U.S. PATENT DOCUMENTS

| | | | |
|---|---|---|---|
| 2002/0183073 A1 | 12/2002 | Morgand et al. | |
| 2017/0374637 A1 | 12/2017 | Akkarakaran et al. | |
| 2018/0020329 A1* | 1/2018 | Smith | H04L 67/12 |
| 2019/0075543 A1* | 3/2019 | Kim | G01S 5/02 |

OTHER PUBLICATIONS

Lu (WO/2019/056982 A1, PCT/CN2018/105607) discloses an apparatus and method in wireless communication system and computer readable storage medium. (Year: 2019).*

Detecting and Locating Cell Phone Signals From Avalanche Victims Using Unmanned Aerial Vehicles, 2015 International Conference on Unmanned Aircraft Systems (ICUAS), Denver Marriott Tech Center, Denver, Colorado—Jun. 9-12, 2015.

ETSI TS 136 331 V14.5.1, Technical Specification, LTE; Evolved Universal Terrestrial Radio Access (E-UTRA); Radio Resource Control (RRC); Protocol specification (3GPP TS 36.331 version 14.5.1 Release 14)—Jan. 2018.

ETSI TS 136 355 v14.4.0, Technical Specification, LTE; Evolved Universal Terrestrial Radio Access (E-UTRA); LTE Positioning Protocol (LPP) (3GPP TS 36.355 version 14.4.0 Release 14)—Jan. 2018.

3GPP TSG-RAN WG2 #98-AdHoc, Qingdao, China; Source: Ericsson; Title: Measurement events in NR (Tdoc R2-1706948)—Jun. 27-29, 2017.

PCT International Search Report issued for International application No. PCT/SE2018/051083—dated Dec. 21, 2018.

3GPP TSG-RAN WG2 #98, Hangzhou, P.R. of China; Source: Ericsson; Title: Measurement configuration of IDLE RS (Tdoc R2-1704104)—May 15-19, 2017.

PCT Written Opinoin of the International Searching Authority issued for International application No. PCT/SE2018/051083—dated Dec. 21, 2018.

* cited by examiner

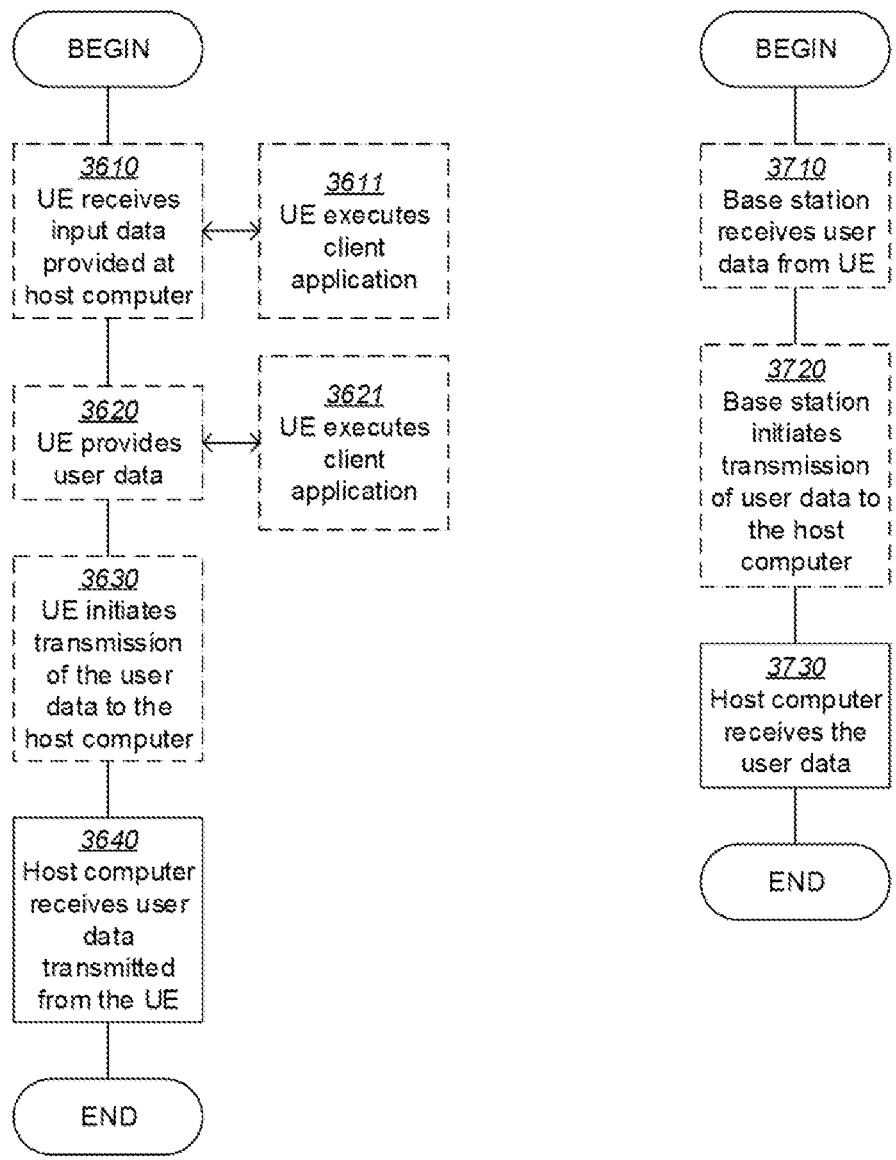

NETWORK NODE, USER EQUIPMENT, AND METHODS IN A WIRELESS COMMUNICATIONS NETWORK

PRIORITY

This nonprovisional application is a U.S. National Stage Filing under 35 U.S.C. § 371 of International Patent Application Serial No. PCT/SE2018/051083 filed Oct. 23, 2018 and entitled "Network Node, User Equipment, and Methods in a Wireless Communications Network" which is hereby incorporated by reference in its entirety.

TECHNICAL FIELD

Embodiments herein relate to a network node, a User Equipment (UE), and methods therein. In some aspects, they relate to locating the UE and assisting the network node in locating the UE.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

In 3GPP Dual-Connectivity (DC) has been specified, both for LTE and between LTE and NR. In DC two nodes involved, a Master Node (MN) or (MeNB) and a Secondary Node (SN) or (SeNB). Multi-Connectivity (MC) is the case when there are more than two nodes involved.

A common system to locate avalanche survivors is the RECCO® system. The system relies on passive tags, generally attached to the clothing, and an active portable sender operated by the search unit. This sender will project a beam that will travel through the snow, reflect on the tag, and will be detected by the sender. Based on this radar, the Search and Rescue (SAR) unit of the system will be able to locate survivors.

There are also solutions simulating the existence of a mobile cell for disconnected UEs, which try to make them register in the network, and once they begin transmitting, use a series of antennas to triangulate the origin of the transmission. See US 20020183073 A1, and U.S. Pat. No. 7,398,086 B2. The solution in U.S. Pat. No. 7,398,086 B2 only allows UEs to talk to other UEs in the same simulated Radio Base Station (RBS), as it lacks a core network and does not have data capabilities.

There are also Applications that may be installed at a UE. The Applications when running on the UE are capable of transmitting a location of the UE continuously, which may be used to locate the devices or create a temporary wireless network to use as a beacon. See e.g. V. Wolfe, W. Frobe, V. Shrinivasan and T. Y. Hsieh, *"Detecting and locating cell phone signals from avalanche victims using unmanned aerial vehicles,"* 2015 *International Conference on Unmanned Aircraft Systems (ICUAS)*, Denver, Colo., 2015, pp. 704-713.

In LTE, paging to a UE is done via Tracking Area Codes (TAC). Tracking Areas (TAs) are composed of groups of cells with the same TAC. If the UE moves between cells belonging to the same TA, the UE does not need to notify the network. Paging towards a UE is broadcasted in all the cells in a TA.

In case the UE moves to a cell in a different TA, the UE needs to notify the Mobility Management Entity (MME) of its new location, so paging can be directed to the right TA.

However, these solutions are not so effective.

SUMMARY

An object of embodiments herein is to improve the way of locating a UE in a wireless communications system.

According to an aspect of embodiments herein, the object is achieved by a method performed by a network node for locating a User Equipment, UE. The network node, the at least one portable network node and UE operate in a wireless communication network.

The network node configures the at least one portable network node to broadcast reference signals. The broadcasted reference signals trigger the UE to subsequently measure and report the quality of the respective reference signals to the network node.

The network node then receives subsequent measurement reports from the UE. Each measurement report comprises a current quality value of the reference signals sent by the respective at least one portable network node.

The network node manages the respective at least one portable network node to approach the position of the UE by: Meanwhile analyzing the subsequent measurement reports, commanding each of the at least one portable network node to move in a direction that is decided based on the analysis of its corresponding subsequent measurement reports one by one upon receiving them. The moving direction is to be performed such that quality values of its corresponding reference signals in subsequent measurement reports are increasing.

According to another aspect of embodiments herein, the object is achieved by a method performed by a User Equipment, UE, for assisting a network node in locating the UE. The UE, at least one portable network node and network node operate in a wireless communication network.

The UE receives broadcasted reference signals from the at least one portable network node. The broadcasted reference signals trigger the UE to measure and report to the network node, the quality of the reference signals sent by the respective at least one portable network node. The UE subsequently measures the quality of the respective reference signals. For each of the respective at least one portable network node, the UE sends respective subsequent measurement reports to the network node. Each measurement report comprises a current quality value of its reference signals. The subsequent measurement reports assists the network node to command each of the respective at least one portable network node to move in a direction such that quality values of its corresponding reference signals in the subsequent measurement reports are increasing.

According to another aspect of embodiments herein, the object is achieved by a network node for locating a User Equipment, UE. The network node, at least one portable network node and the UE are operable in a wireless communication network. The network node is configured to:

Configure the at least one portable network node to broadcast reference signals, triggering the UE to subsequently measure and report the quality of the respective reference signals to the network node, receive subsequent measurement reports from the UE, wherein each measurement report comprises a current quality value of the reference signals sent by the respective at least one portable network node, and manage the respective at least one portable network node to approach the position of the UE by: meanwhile analyzing the subsequent measurement reports, command each of the at least one portable network node to move in a direction that is decided based on the analysis of its corresponding subsequent measurement reports one by one upon receiving them, which moving direction is adapted to be to be performed such that quality values of its corresponding reference signals in subsequent measurement reports are increasing.

According to yet another aspect of embodiments herein, the object is achieved by a User Equipment, UE, for assisting a network node in locating the UE. The UE, at least one portable network node and network node are operable in a wireless communication network. The UE is configured to:

Receive broadcasted reference signals from the at least one portable network node, triggering the UE to measure and report to the network node, the quality of the reference signals sent by the respective at least one portable network node,—subsequently measure the quality of the respective reference signals, and—for each of the respective at least one portable network node, send respective subsequent measurement reports to the network node, wherein each measurement report is adapted to comprise a current quality value of its reference signals, and which subsequent measurement reports are adapted to assist the network node to command each of the respective at least one portable network node to move in a direction such that quality values of its corresponding reference signals in the subsequent measurement reports are increasing.

By triggering the UE to measure and report, the quality of the reference signals sent by the respective at least one portable network node and subsequently moving the least one portable network node in a direction such that quality values of its corresponding reference signals in subsequent measurement reports are increasing, the at least one portable network node will approach the UE. After a number of subsequent movements the UE will be located. This results in an improved way of locating a UE in a wireless communications system. This is e.g. since:

It allows for simple cooperation for multiple portable network nodes.

it allows for maintaining voice and data connections, and over time, it enhances the precision of the method as more measurements are collected.

Further advantages of embodiments herein are that they:

Allow a UE to remain connected to wireless communications network.

Allow simpler, smaller and cheaper portable network nodes, compared to nodes based on angle of arrival.

Allow coordination of the portable network nodes with the network to reduce interference with normal operations. The portable network nodes may be reconfigured as they move through the wireless communications network and they will not impact other UEs that do not need to be located.

Do not require additional applications installed in the UE prior to the method.

BRIEF DESCRIPTION OF THE FIGURES

FIGS. 13-16 are flowcharts illustrating methods implemented in a communication system including a host computer, a base station and a user equipment.

DETAILED DESCRIPTION

As part of developing embodiments herein, a problem was identified by the inventors, and will first be discussed.

The tags of RECCO system are often available in mid and high end winter sport clothing. Not everyone has those clothes in emergency situations, but almost everyone has a mobile device in their pocket most of the time.

The solution based on locating the origin of the transmission is difficult to implement, and the equipment is expensive and bulky.

If the UE is already connected to a network and is in Radio Resource Control (RRC) idle mode, the network will not be able to locate the UE, as the UE will passively listen as long as the cell and/or TAC the UE is camped on is present.

Using Angle of Arrival with multiple mobile base stations, while feasible, would be very complicated, as there are timing considerations with other UEs, and synchronization problems with the UE uplink.

The Application based location requires prior installation of the application in the UE. In the case of broadcasting the location, the UE needs to be connected continuously with the existing network, in the case of using a wireless LAN as a beacon, it requires significant battery.

Furthermore, if using the proposed simulated cell in a city, if not using the Public Land Mobile Network (PLMN) of an operator, such as e.g. Telia, for their global cell id, the UEs will prioritize Telia's Home PLMN even if the cells have worse quality.

If using the PLMN of an operator, lots of unwanted UEs will try to connect to their cell and fail, disturbing traffic in the network.

Therefore an object of embodiments herein is to improve the way of locating a UE in a wireless communications system.

According to some embodiments herein, a UE is forced to report signal quality such as Reference Signal Received Power (RSRP) of a portable network node, with the aim to approach and locate a UE position by moving the portable network node towards a maximum signal quality.

The UE may be configured to start performing measurements such as e.g. LTE A1, A4 or B1. LTE event A1 is triggered when the serving cell becomes better than a threshold. LTE event A4 is triggered when neighbor cell becomes better than a threshold. LTE event B1 is triggered when Inter RAT neighbor cell becomes better than a threshold.

The UE may e.g. be configured e.g. instructed to start performing the measurements of LTE A1, A4 since it is desired that the UE remains connected to the operator network and report neighboring cells, or B1 if the portable cells are, other radio technology, like NR cells, or equivalent measurements, or a combination of them, and report signal quality of the portable network node to a network node. The result from the measurement may e.g. be transmitted to the portable network node so that it can be moved in a direction towards the maximum signal quality. The result from the measurement may then be presented it to an eventual search team so they can know when they are approaching the UE.

Figure 1:
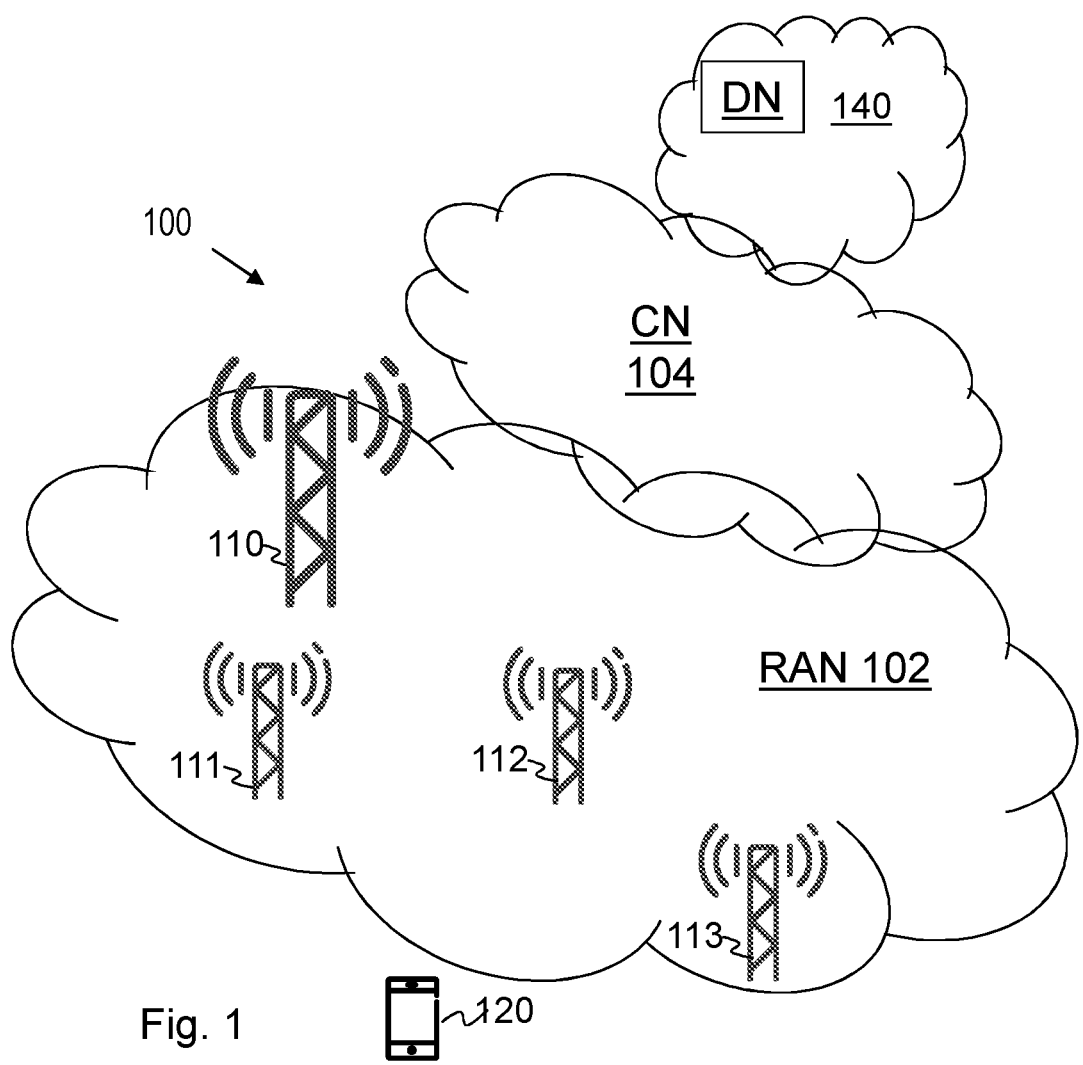
FIG. 1 is a schematic block diagram illustrating embodiments of a wireless communications network.

Embodiments herein relate to wireless communication networks in general. FIG. 1 is a schematic overview depicting a wireless communications network 100. The radio communications network 100 comprises one or more RANs 102 and one or more CNs 104. The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the radio communications network 100, such as a network node 110, and at least one network node that is portable such as a portable network node 111, a portable network node 112 and a portable network node 113. The respective network nodes 110, 111, 112 and 113 provide radio coverage over a geographical area, which may also be referred to as a cell, a beam or a beam group of the same or different a Radio Access Technology (RAT), such as 5G, LTE, NB-IoT, CAT-M, Wi-Fi, eMTC or similar. The respective network node 110, 111, 112 and 113 may e.g. be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a UE within the radio coverage area served by the respective network node 110, 111, 112 and 113 depending e.g. on the radio access technology and terminology used. The respective network node 110, 111, 112 and 113 may communicate with a UE 120 with Downlink (DL) transmissions to the UE and Uplink (UL) transmissions from the UE.

The network node 110 may e.g. be an ordinary network node in a RAN. In some embodiments the network node 110 is owned by an operator. In some embodiments the network node is collocated with one of the at least one portable network nodes 111, 112, 113.

The portable network node 111, the portable network node 112 and the portable network node 113, are referred to as the at least one portable network node 111, 112, 113. Being portable means that the at least one portable network node 111, 112, 113 can be moved. The at least one portable network node 111, 112, 113 may each be moved by e.g. being carried by a person, such as e.g. a rescue staff or any one searching for a UE or a person carrying a UE. The at least one portable network node 111, 112, 113 may each further be located on a vehicle, such as a car, a boat, a drone to be portable. A further example comprises moving radio beams. A yet further example comprises varying the transmission power as being portable. From the point of view of the UE, it will look like the node is moving away or closer to it.

In embodiments herein, the network node 110 manages the at least one portable network nodes 111, 112, 113 to approach a UE 120 that is to be found.

In the wireless communication network 100, UEs e.g. the UE 120 operate. The UE 120 may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "UE" is a non-limiting term which means any terminal, wireless communication terminal, wireless device, Device to Device (D2D) terminal, or node e.g. smart phone, laptop, mobile phone, sensor, relay, mobile tablets or even a small base station communicating within a cell.

In embodiments herein, the UE 120 is to be found or e.g. the user carrying the UE 120 is to be found. The UE 120 may e.g. be placed in a pocket, a bag or a back pack of its user, or be very close to its user.

Methods for locating the UE 120 are performed by the network nodes 110. As an alternative, a Distributed Node DN and functionality, e.g. comprised in a cloud 140 as shown in FIG. 1 may be used for performing or partly performing the methods.

Embodiments herein focus on LTE, but the solution is conceptually portable to other standards supporting measurement events, like, but not limited to, GSM, WCDMA or NR.

Embodiments herein provide the at least one portable node 111, 112, 113 capable to able to broadcast reference signals. This may e.g. be referred to as being capable of broadcasting a cell, e.g. with a respective new TAC, see below.

The UE 120 will be requested to perform measurements on the at least one portable node 111, 112, 113 continuously and report them. A node such as the network node 110 may then be able to receive that information and present it to the at least one portable node 111, 112, 113. This may e.g. be a respective user such as a member of the rescuing team, of the at least one portable node 111, 112, 113, which will then be able to move progressively closer to the UE 120, based on the gradient of the received power information, and e.g. current and previous positions such as acquired via GNSS or equivalent method.

Figure 2:
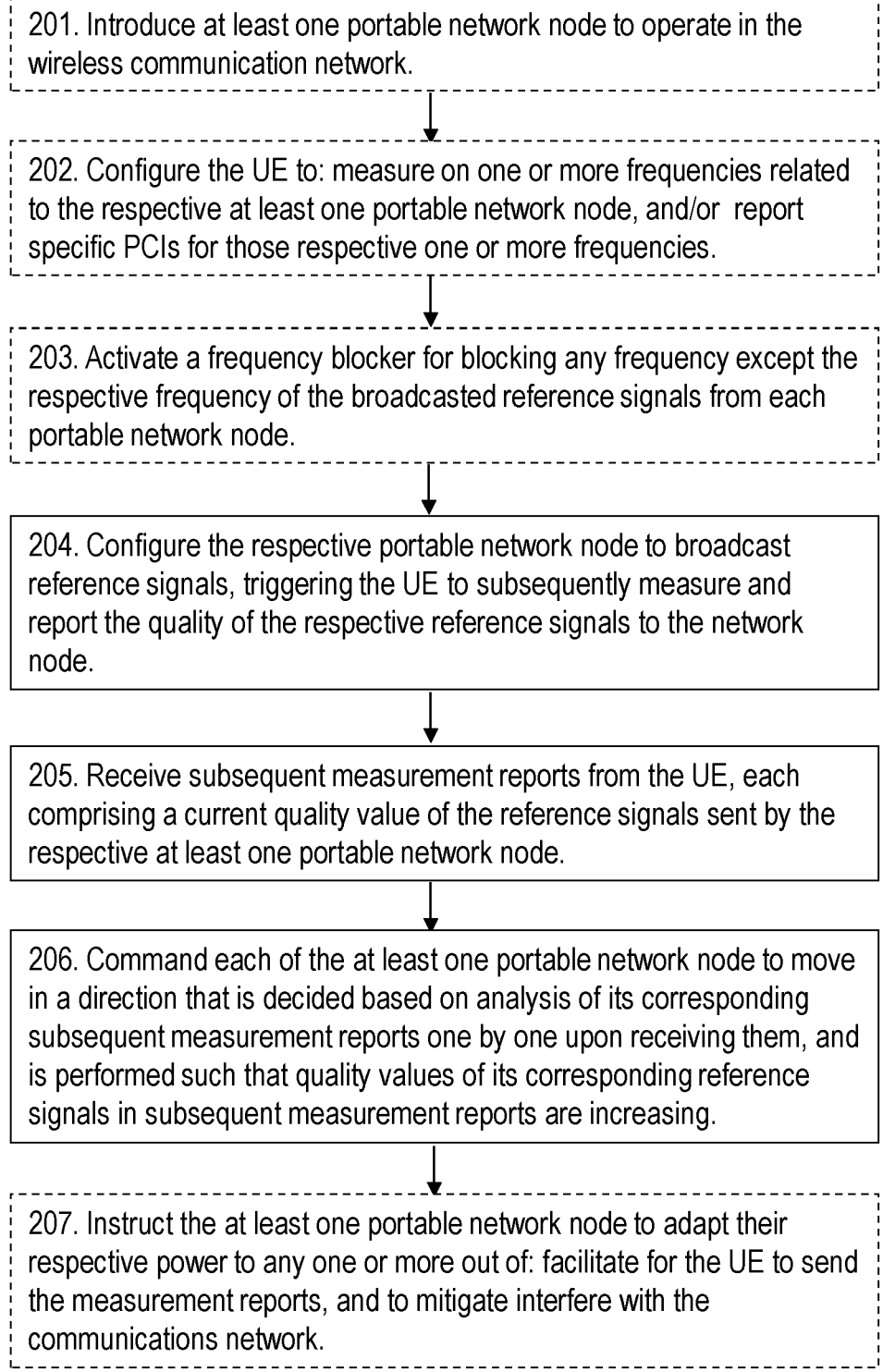
FIG. 2 is a flowchart depicting embodiments of a method in a network node.

Example embodiments of a flowchart depicting embodiments of a method performed by a network node 110, 111 for locating the UE 120, are depicted in FIG. 2 and will be described more in detail in the following. The network node 110, 111, the at least one portable network node 111, 112, 113 and the UE 120 operate in the wireless communication network 100. As mentioned above, the network node 110, 111 may be collocated with one of the at least one portable network node 111.

The method may comprise one or more of the following actions which actions may be taken in any suitable order.

According to an example scenario the UE 120 and possibly its user together with other users of other UEs are lost, e.g. due to a catastrophe such as e.g. earthquake. I.e. there may be many users to find.

According to another example scenario the UE 120 and possibly its user are lost, e.g. due to a catastrophe such as e.g. an avalanche. The UE 120 and possibly its user may not be visible. A rescuing team is about to start to try to find the UE 120. The rescuing team will use the network node 110, 111 and in this example scenario only one portable network node 111, to approach the position of the UE 120. Further, in this example the network node 110 is collocated with the portable network node 111, and is thus also portable, and is referred to as the portable network node 110, 111. The portable network node 110, 111 may e.g. be handheld, by a person such as e.g. skiing person or may be placed on a snow scooter, a helicopter or anywhere, where it can be movable in a direction according to a command.

Action 201.

The rescuing team may start the rescuing work to find the UE 120 and possibly also other UEs, in a place within an area where it is likely to find the UE 120. However, the example used herein relate to finding a single UE 120. The portable network node 110, 111 may in some embodiments be added to the wireless communications network 100 to which the UE 120 is assumed to be related to e.g. by being switched on, but e.g. being in idle mode. This is to allow for the portable network node 110, 111 to start sending reference signals that can be received by the UE 120 if it is within radio range of the portable network node 110, 111, i.e. within a portable cell provided by the portable network node 110, 111. The UE may e.g. be in idle mode if there is no support from the network.

Thus in some embodiments, when approaching the position of the UE 120 is required, the network node 110, 111 introduces the at least one portable network node 111, 112, 113 to operate in the wireless communication network 100.

When the at least one portable network node 111, 112, 113 is added to the network, it may start to broadcast cell information and reference signals that may be heard by the UE 120 if it is within radio coverage.

Action 202.

In some embodiments, the network node 110, 111 may then configure the UE 120 to any one or more out of: Measure on one or more frequencies related to the respective at least one portable network node 111, 112, 113, and report specific Physical Cell Identities (PCIs) for those respective one or more frequencies. This may e.g. be to measure on one or more frequencies related to the respective at least one portable network node 111, 112, 113, and to report specific Physical Cell Identities, PCIs, for those respective one or more frequencies. As an alternative in some embodiments, to measure on one or more frequencies related to the respective at least one portable network node 111, 112, 113, or report specific Physical Cell Identities, PCIs, for those respective one or more frequencies.

The specific PCIs may change dynamically. This may be performed such that the UE 120 reports different PCIs for the subsequent measurement reports of the portable network node 110 111.

It is desirable, that the UE 120 is able to measure in different PCIs, it is also desirable to be able to reconfigure the portable network nodes 110, 111, 112, 113 with different PCIs as the portable network nodes 110, 111, 112, 113 move through the wireless communications network. This is since, if the portable network node 110, 111, 112, 113 is broadcasting a PCI 100 and goes into a cell that is already broadcasting PCI 100, there may be a PCI conflict. Some embodiments herein therefore are able to reconfigure the portable network nodes 110, 111, 112, 113 to change the PCI to, say, 101, as they enter the cell with PCI 100. This will e.g. avoid PCI conflicts with the stationary network as the nodes move.

Action 203.

It is important the UE 120 can detect the reference signals transmitted by the portable network node 110, 111, even if the reference signals are weak due to being sent far away from the UE 120. In some embodiments, a frequency blocker and/or frequency jammer may be used in conjunction with the at least one portable node 111, 112, 113, so from the UE 120 point of view only the reference signals, e.g. the cell broadcasted by the at least one portable node 111, 112, 113, is visible. The cell of the respective at least one portable node 111, 112, 113, may have a different TAC than the cells the UE 120 was previously connected to, forcing the UE 120 to leave the RRC idle mode to perform a tracking area update procedure, also referred to as TrackingAreaUpdate procedure. A tracking area update procedure is a Non-Access-Stratum (NAS) procedure performed by the UE to notify the Core Network of the new UE location, for paging purposes. To perform the Tracking Area Update, the UE goes into RRC_CONNECTED mode. Once in RRC connected mode, the UE 120 may be configured by the respective at least one portable node 111, 112, 113 with the cell to continuously report LTE A1, A3, B1, C1 or W1 measurements or similar. As partly mentioned above, an LTE A1 measurement is a measurement where the UE is configured to report when the serving cell, the cell the UE is connected to, is below a given threshold. An A3 measurement configures the UE to report when a neighboring cell is below a given threshold. For a B1 and W1 measurement the UE reports when neighboring cells using another radio access technology are below a given threshold, or when a neighboring WLAN is below a given threshold. A C1 measurement is similar, but the UE reports when CSI-RS is better than a given threshold.

Therefore in some embodiments, the network node 110, 111 activates a frequency blocker for blocking any frequency except the respective frequency of the broadcasted reference signals from each of the at least one portable network node 111, 112, 113. This e.g. blocks the reference signals for the cell, and will disconnect the UE 120 from the cell, or degrade the quality of the serving cell so to trigger the UE 120 to move to another, better, cell once the serving cell has been blocked or degraded. A frequency blocker or frequency jammer is a device that transmits signals over a frequency range to over-power other transmissions in the same frequency range. This may be performed by transmitting a broad signal over the whole spectrum where the cell is located, or by transmitting a signal over the reference signals of the cell.

Action 204.

In some embodiments, the network node 110, 111 may configure the at least one portable network node 111, 112, 113 to broadcast reference signals. This may be performed by an application running on the portable network nodes 111, 112, 113, or with some other type of additional signaling over an existing interface, e.g. X2, Xn, or a new interface or a system, e.g. Operations Support System (OSS) interacting with the portable node O&M interface.

When the at least one portable network node 111, 112, 113 is added to the wireless communications network 100 and has been configured, it may start to broadcast cell information and reference signals that may be heard by the UE 120 if it is within radio coverage. These reference signals will trigger the UE 120 to subsequently measure and report the quality of the respective reference signals to the network node 110, 111. The portable network node 110, 111 may be brought to an area where it is likely to find the UE 120 and start to send the reference signals there.

Action 205.

When being within radio coverage of the portable network node 110, 111, the UE 120 receives the reference signals and starts to subsequently measure the reference signals and subsequently sending a report one by one, comprising the respective measurement result. The network node 110, 111 thus receives subsequent measurement reports from the UE 120. Each measurement report comprises a current quality value of the reference signals sent by the respective at least one portable network node 111, 112, 113.

Action 206.

The aim is to move the portable network node 110, 111 towards the UE 120 closer and closer. E.g. analyze two subsequent measurement reports by first checking a first measurement report (A) resulting from the portable network node 110, 111 being located at a point A. Then move the portable network node 110, 111 one step in some direction to a point B. Thereafter compare a subsequent measurement report (B) resulting from the portable network node 110, 111 being located at a point B with the measurement report (A) resulting from the portable network node 110, 111 being located at a point A. This will be explained more in detail below when describing FIG. 4.

If the quality value the reference signals in the subsequent measurement report (B) are better than the quality value the reference signals in the first measurement report (A), the portable network node 110, 111 has been moving in a direction towards the UE 120 and is then 1 bit closer. This is a good result, so next stage may be to move one more step in the same direction.

If the quality value the reference signals in the subsequent measurement report (B) are worse than the quality value the reference signals in the first measurement report (A), the portable network node 110, 111 has been moving in a direction more far from the UE 120 and is thus more far away from the UE 120. This is a good result, so next stage may be to move back and then try a step in the opposite direction.

According to embodiments herein, the network node 110, 111 manages the respective at least one portable network node 111, 112, 113 to approach the position of the UE 120. This is performed by, meanwhile analyzing the subsequent measurement reports, the network node 110, 111 commands each of the at least one portable network node 111, 112, 113 to move in a direction. This moving direction is decided based on the analysis of its corresponding subsequent measurement reports one by one upon receiving them. The moving direction is to be performed such that quality values of its corresponding reference signals in subsequent measurement reports are increasing.

This may e.g. be calculated by increase received power quality on the reference signals on the at least one portable network node 111, 112, 113, in combination with their movement record, or by combining with the received quality with previous measurement reports from the same UE 120 or other UEs, or by a combination of the reports with existing environmental data, e.g. terrain or buildings, together with the previous two reports.

In some embodiments, the moving direction of the respective at least one portable network node 111, 112, 113 is decided further based on information of current and previous positions of the UE 120. This may e.g. be obtained from any one or more out of a Global Navigation Satellite Systems (GNSS), Bluetooth beacons, and Ultra-Wideband.

Action 207.

The network node 110, 111 may also instruct the at least one portable network node 111, 112, 113 to adapt their respective power. This may be performed in order to any one or more out of: Facilitate for the UE 120 to send the measurement reports, and mitigate interfere with the communications network 100, e.g., to not saturate the reporting capabilities of the UE 120, or to not interfere with the wireless communications network 100. This may be performed by an application running on the at least one portable network node 111, 112, 113, or with some other type of additional signaling over an existing interface, e.g. X2, Xn, or a new interface or a system, e.g. OSS, interacting with the portable node Operations and Maintenance (O&M) interface.

An advantage is that by using the method, it is possible for the at least one portable network node 111, 112, 113 to come closer and closer to the UE 120. E.g. persons from the rescue team moving the at least one portable network node 111, 112, 113 in the direction towards the UE 120 and the user of the UE 120 will come closer and closer to the user of the UE (120) and in the end find and rescue the user of the UE (120).

Figure 3:
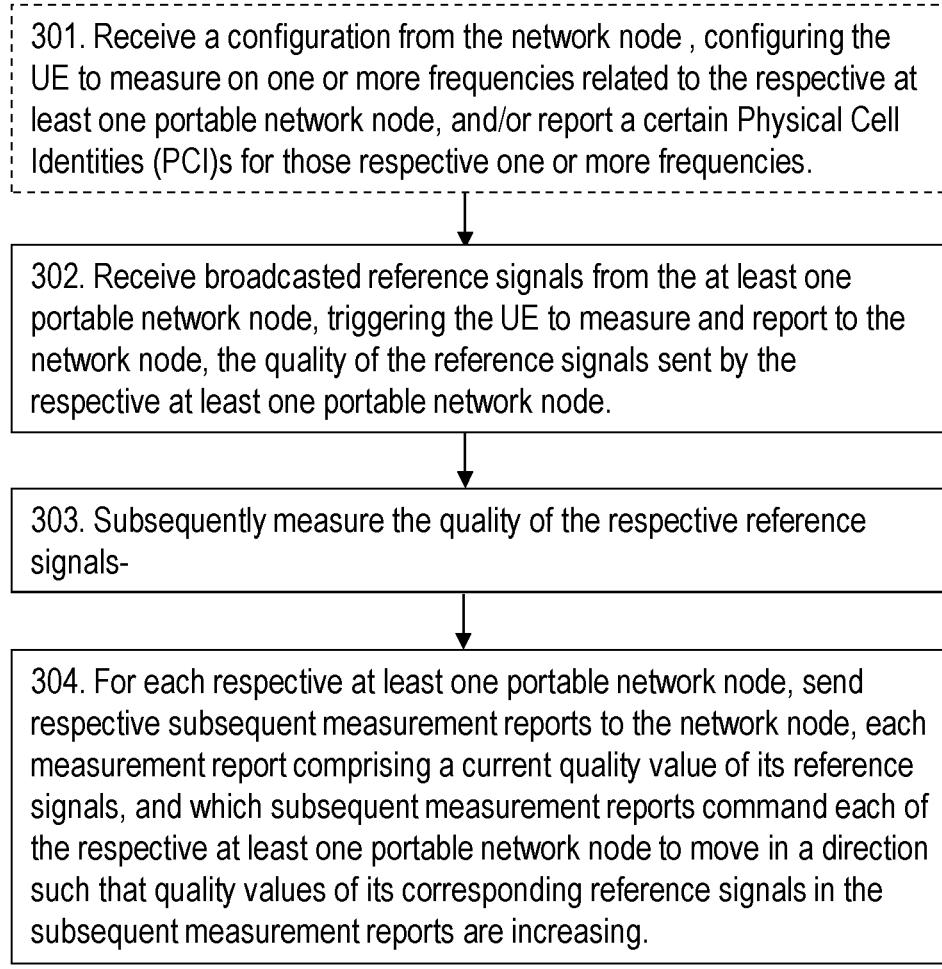
FIG. 3 is a flowchart depicting embodiments of a method in a UE.

Example embodiments of a flowchart depicting embodiments of a method performed by the UE 120 for assisting the network node 110, 111 in locating the UE 120, are depicted in FIG. 3 and will be described more in detail in the following. The method described above relate to the network node perspective. Below, the method will be described from the UE 120 perspective using the same example scenario. As mentioned above, the UE 120, the at least one portable network node 111, 112, 113 and the network node 110, 111 operate in a wireless communication network 100.

The method may comprise one or more of the following actions which actions may be taken in any suitable order.

Action 301.

The UE 120 may receive a configuration from the network node 110, 111, e.g. via the serving cell. The configuration may also be referred to as configuration information or a configuration instruction. The configuration configures the UE 120 to any one or more out of: Measure on one or more frequencies related to the respective at least one portable network node 111, 112, 113, and optionally report a certain Physical Cell Identities PCIs for those respective one or more frequencies. This may be received in a RRC Reconfiguration message, indicating the measurement report configuration that the UE 120 shall use. This is to make the UE 120 perform specific measurements, e.g. indicate the threshold to use in e.g. the A1-3 measurement, and what periodicity should be used for the reporting.

The specific PCIs may change dynamically in subsequent RRC Reconfiguration messages as the portable network nodes 111, 112, 113 may change their PCIs or frequencies dynamically.

Action 302.

The UE 120 may detect the at least one portable network node 111, 112, 113 e.g. by performing the configured measurements requested by the serving cell on the network node.

The UE 120 receives broadcasted reference signals from the at least one portable network node 111, 112, 113. These reference signals trigger the UE 120 to measure and report to the network node 110, 111, the quality of the reference signals sent by the respective at least one portable network node 111, 112, 113.

Action 303.

As mentioned above, when being within radio coverage of the portable network node 110, 111, the UE 120 receives the reference signals and starts to subsequently measure the reference signals and subsequently sending a report one by one, comprising the respective measurement result.

The UE 120 subsequently measures the quality of the respective reference signals. This may be performed by measuring the respective reference signals at predetermined intervals.

Action 304.

For each of the respective at least one portable network node 111, 112, 113, the UE 120 sends respective subsequent measurement reports to the network node 110, 111. Each measurement report comprises a current quality value of its reference signals.

The measurement reports may e.g. be sent in a message such as RRC measurement report.

The subsequent measurement reports assists the network node 110, 111 to command each of the respective at least one portable network node 111, 112, 113 to move in a direction such that quality values of its corresponding reference signals in the subsequent measurement reports are increasing. This is explained above together with Actions 205 and 206.

The reports may be sent to the network node 110, 111, who will calculate and decide the respective moving directions and informing the respective at least one portable network node 111, 112, 113 about the decided moving directions. As an alternative the reports may be sent to the respective at least one portable network node 111, 112, 113, who will calculate and decide the moving direction.

Embodiments herein may comprise one or more of the following advantages:

UEs such as the UE 120 are currently ubiquitous in pockets of the UE users, even in the less developed areas.

Embodiments herein may be used not only for avalanches, but for any type of disasters, and furthermore, locating the UE 120 even in non-disaster scenarios, like deployed sensors in a forest whose location is unclear.

Compared with prior art solutions, provided embodiments herein offer the following benefits:

Keep the UE 120 connected to the wireless communications network e.g. voice and/or data, so that the UE 120 may be used as normally.

Use smaller and cheaper equipment, e.g. a 0.5 Kg portable network node 110, 111, 112, 113.

Being battery operated for a long time, as the portable network node 110, 111, 112, 113 may be carried by a human or a much smaller drone.

Allow to coordinate multiple portable network nodes by the already existing network cheaply. This means that no modification is needed to the network hardware, it is easily deployed and it may be controlled by an application "over the top".

Adapt its output power depending on distance/past measurements to optimize the measurements by target UE 120, allowing avoiding saturating the UE 120.

Would work in environments with lots of UEs.

In some embodiments herein, subsets of UEs e.g. comprising the UE 120 may be configured via the operator network. Also UEs e.g. comprising the UE 120 may be configured to only measure PCIs, so the mobile cells will only have to broadcast synchronization signal and nothing else. New UEs e.g. comprising the UE 120 that see these cells will discard them as they do not contain the minimum system information they need, e.g. SIB1, to perform a random access, but still have enough information to measure on them.

Does not assume which bands are supported by the UEs e.g. comprising the UE 120.

Coordinate with the operator networks to avoid e.g. PCI conflicts.

Embodiments herein provide the use of existing standards to provide a simple, robust, cheap and responsive system to assist locating UEs and present the data to field personnel.

The at least one portable network nodes 111, 112, 113 may be introduced in the wireless communications network 100.

In some embodiments, an operator network e.g. the operator of the UE 120, assists by modifying its cell reselection information, e.g. via the System Information Block (SIB), SIB-3, SIB-4, SIB-5 or via a newly defined SIB for this context. SIB is a message with information broadcasted by the network nodes providing information to the UEs about the cell capabilities and configuration as well as reselection priorities or other cells. The network node 110, 111 may belong to the operator network.

It is also possible that a cell reselection is done per UE such as the UE 120 via the RRC procedure RRC connection reconfiguration. In either of these ways, no frequency jammer is needed, and a higher granularity in which the at least one portable network nodes 111, 112, 113 is moved to the UE 120 can be achieved. A higher granularity means it can be controlled which UE the portable network node 111, 112, 113 is getting closer. With a jammer all the UEs within range are getting closer or more far away from the portable network node 111, 112, 113.

As an example, in case of an earthquake, the operator network e.g. the operator of the UE 120, may change its cell reselection information during the time since the earthquake is detected till the waves hit the area prioritizing these cells to facilitate the work of emergency services in locating people. In this example, there are many UEs to approach and find.

In both these example scenarios, the UE 120 may initiate a Tracking Area Update procedure when under the coverage of a new cell provided by the respective at least one portable network node 111, 112, 113. Once in RRC connected mode the UE 120 is requested to start performing measurements of the quality of the reference signals sent by the respective at least one portable network node 111, 112, 113, such as e.g. A1 measurements continuously, and reporting the result such as e.g. Reference Signal Received Power (RSRP).

The new cell of the respective portable network node 111, 112, 113 may not be connected to a real E UTRAN Core Network (ECN), but it may be better to use Evolved Packet Core (EPC) or 5G Core Network (5GC) and Packet Data Network (PDN), and thus may or may not be able to handle user plane data. Handling user plane data when used herein means handle traffic other than signalling between network nodes. That includes calls between devices such as UEs and data, for example, going from and to the Internet.

In both previous example scenarios, the UE 120 will perform a Random Access (RA) procedure, with may be used by the portable network node 110, 111 to further estimate the UE 120 position based on the Time Alignment achieved in the RA procedure. The network node 110 or the portable network node 110, 111 may also configure a dedicated time alignment timer such as timeAlignmentTimerDedicated and/or a common time alignment timer such as a timeAlignmentTimerCommon which may be indicated in SIB-2. This is to request additional time adjustments by the UEs such as the UE 120, which may be used to calculate the Timing Advances. The Timing Advances may be used for enhancing the precision of the location estimations.

In some other embodiments, the network node 110, 111 may request the UE 120 to perform measurements in the frequency in which the at least one portable network node 111, 112, 113 operates, while still being connected to the network, via an RRC connection reconfiguration e.g. an RRCConnectionReconfiguration.

The UE 120 may then report the result of the measurement to the network node 110, 111, and the network will forward the resulting data to the at least one portable network node 111, 112, 113 to calculate the moving direction e.g. to the field operators also referred to as the field personnel, operating the respective at least one portable network node 111, 112, 113. The field personnel may e.g. be comprised in a rescuing team, for rescuing a user of the UE 120.

The at least one portable network node 111, 112, 113 may broadcast multiple PLMNs corresponding to the common PLMNs of the operators of the area, plus additional PLMNs not used by operators, depending on implementation. This means that the network node will broadcast several PLMN identities, such as operator identities, e.g. Telia.

In this way, the UE 120 when being in its home PLMN will prioritize the reference signals e.g. the cell of the respective at least one portable network node 111, 112, 113. Further, the UE 120 that tried to connect to the operator PLMNs and were rejected will attempt to connect to the cell provided by the respective at least one portable network node 111, 112, 113, since the PLMN will not be in the list of forbidden PLMNs.

In any of these embodiments and as mentioned above, it is possible to combine multiple cells, i.e. the portable network node 111, 112, 113, as the UE 120 may be able to report a list of cells provided by the respective at least one portable network node 111, 112, 113 and their respective RSRP. By combining multiple cells, their locations, movement paths, or areas of coverage in time, and their respective measurement reports, better location estimation will be achieved.

Additionally, beamforming may be combined with the embodiments. Steered beams of the respective at least one portable network node 111, 112, 113 cause a fluctuation in the RSRP at the UE 120 depending on the beam direction. This is since beamforming will focus the transmitting power of the cell in one direction, and thus reducing it in others. When both values are combined, the UE 120 position uncertainty is reduced.

The mobile cell of the respective at least one portable network node 111, 112, 113 may vary its transmission power dynamically. This may be with the objective of staying within a dynamic range of the UE 120 measurements, which in one of many examples may be −140 dBm (RSRP_00) ≤measurements≤−44 dBm (RSRP_97). Additionally, this may is used to control the portable cell sizes and search area. Wherein RSRP_00 refers to a received power equal or less than −140 dBm, and wherein RSRP_97 refers to a received power equal or more than −44 dBm.

Any of the embodiments described above may be combined with protocols already defined in LTE Positioning Protocol, 3. ETSI TS 136 355 V14.4.0 (2018-01) LTE Positioning Protocol (LPP), for UEs e.g. the UE 120 and network nodes such as the network node 110, 111, the portable network nodes 111, 112, 113, that support them.

Figure 4:
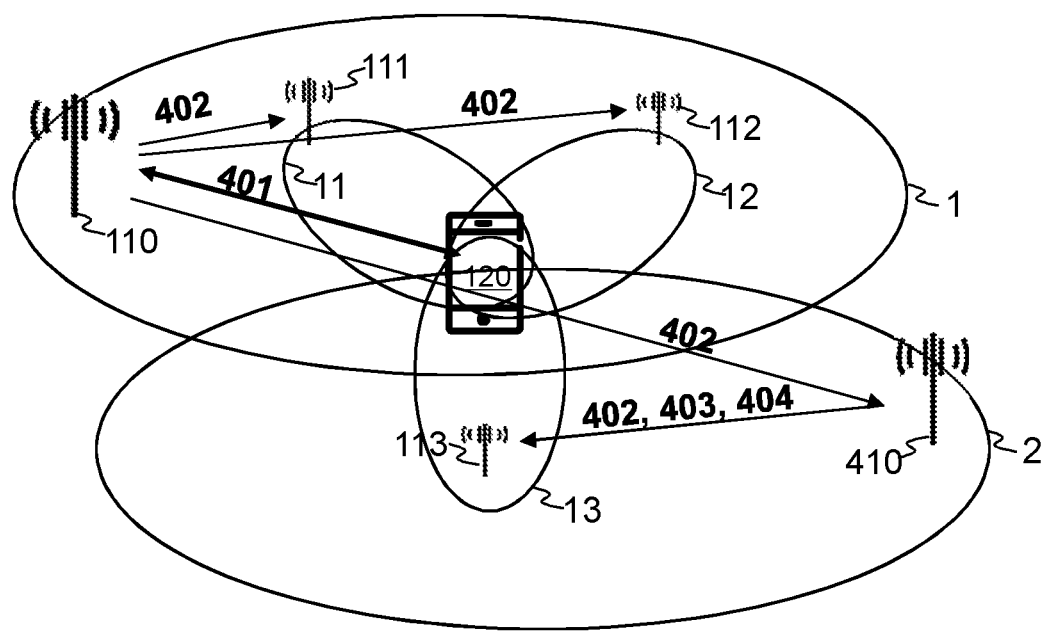
FIG. 4 is a schematic block diagram illustrating embodiments of a wireless communications network.

FIG. 4 discloses an example scenario wherein the at least one portable network nodes 111, 112, 113, comprises the three portable network nodes 111, 112, 113. In the example scenario the UE 120 is connected to operator network node which in this scenario is the network node 110 and is referred to as the operator node 110 in this example. The portable network node 111 provides the portable cell 11, the portable network node 112 provides the portable cell 12 and the portable network node 113 provides the portable cell 13. The portable network nodes 111 and 112 are within radio range i.e. within a first operator cell 1, provided by the operator node 110. The portable network node 113 is not within radio coverage of the operator node 110, but is within radio range i.e. within a second operator cell 2, provided by a second operator node 410. The operator node 110 is capable of communicating with the second operator node 410.

Action 401.

In this example scenario the UE 120 maintains its connection to the operator node 110. The operator node 110 configures additional measurements for the tree portable network nodes 111, 112, 113 providing the cells 1, 2, 3 in the UE 120. The UE 120 subsequently also referred to as continuously, measures the reference signals respective transmitted by the respective tree portable network nodes 111, 112, 113. The UE 120 then sends feedback comprising subsequent measurement reports to the operator node 110. Each measurement report comprises a current quality value of the reference signals sent by the respective portable network node 111, 112, 113.

Action 402.

Proximity feedback on how to move the respective portable network node 111, 112, 113 is sent by the operator node 110 is feed back to the respective portable network node 111, 112, 113. Sending the proximity feedback on how to move comprises as mentioned in Action 206 above, commanding each of the portable network nodes 111, 112, 113 to move in a direction. The direction is decided based on the analysis of its corresponding subsequent measurement reports one by one upon receiving them. The moving direction is to be performed such that quality values of its corresponding reference signals in subsequent measurement reports are increasing.

Thus the proximity feedback is sent continuously, one by one pointing out the moving direction with short intervals, and the portable network nodes 111, 112, 113 follows the feedback and moves step by step in a direction accordingly.

Action 403.

Since the portable network node 113 is not within radio coverage of the operator node 110, but is within radio range the second operator node 410, the proximity feedback on how to move the portable network node 113 is sent by the operator node 110 the portable network node 113 via the second operator node 410.

Action 404.

In some embodiments reconfiguration information such as e.g. new PCI and/or new frequency, is sent from the second operator node 410 to the portable network node 113. This is since the portable network node 113 may change PCI and/or broadcasting frequency.

Figure 5:
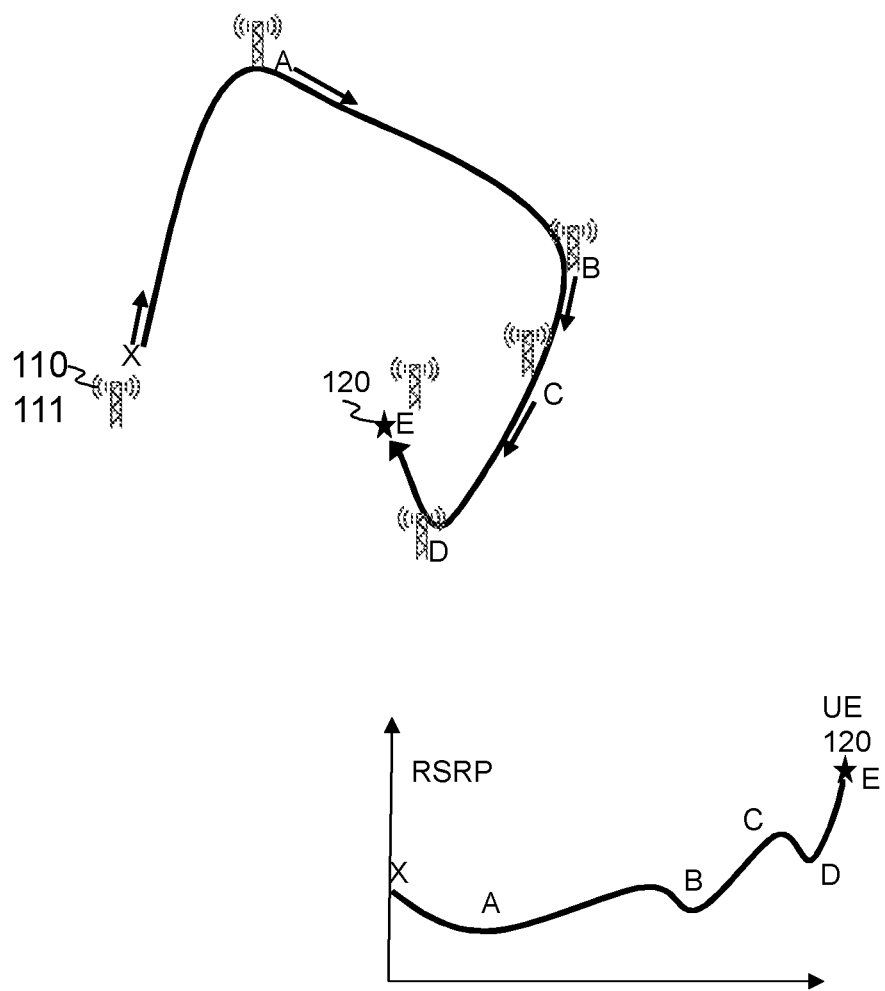
FIG. 5 is a schematic block diagram illustrating embodiments of a wireless communications network.

FIG. 5 illustrates an example of a portable network node 110, 111 moves towards higher quality value of the reference signals sent by the portable network node 111, wherein in this example the portable network node 110, 111 is moved towards higher RSRP. The relation between the movement along the way X, A, B, C, D and E and the respective RSRP along this way is shown in the diagram of FIG. 5.

The missing UE 120 is located at point E in FIG. 5, and the portable network node 110, 111 is located at point X in FIG. 5, when starting the method of locating the UE 120. The portable network node 110, 111 sends reference signals and the UE 120 continuously send sends measurement reports quality values represented by RSRP. FIG. 5 illustrates an example of how the portable network node 110, 111 moves in the process of finding the UE 120 according to embodiments herein. The moving direction is performed such that quality values, i.e. the RSRP, of its corresponding reference signals in subsequent measurement reports are increasing.

Moving Direction from X to A:

The portable network node 110, 111 receives a first RSRP in point X and moves in a random direction or a direction that is believed to be towards the UE 120. When the portable network node 110, 111 is arriving to point A, it receives a second RSRP. The portable network node 110, 111 analyzes the first and second RSRPs, concludes that the second RSRP is worse than the first RSRP, and decides based on this to move in a direction towards point B.

Moving Direction from A to B:

When the portable network node 110, 111 is arriving to point B, it receives a third RSRP. The portable network node 110, 111 analyzes the second and the third RSRPs, concludes that the third RSRP is better than the second RSRP, and decides based on this to move in a direction towards point C.

Moving Direction from B to C:

When the portable network node 110, 111 is arriving to point C, it receives a fourth RSRP. The portable network node 110, 111 analyzes the third and the fourth RSRPs, and concludes that the fourth RSRP is better than the third RSRP. This means that it shall go on and move in a similar direction. The portable network node 110, 111 decides based on this and possible earlier reported measurements to move in a direction towards point D.

Moving Direction from C to D:

When the portable network node 110, 111 is arriving to point D, it receives a fifth RSRP. The portable network node 110, 111 analyzes the fourth and the fifth RSRPs, and concludes that the fifth RSRP is worse than the fourth RSRP. This means that the portable network node 110, 111 has moved too long in this direction. The portable network node 110, 111 decides based on this and possible earlier reported measurements to move in a direction towards point E.

Moving Direction from D to E:

When the portable network node 110, 111 is arriving to point E, it finds the UE 120.

Figure 6:
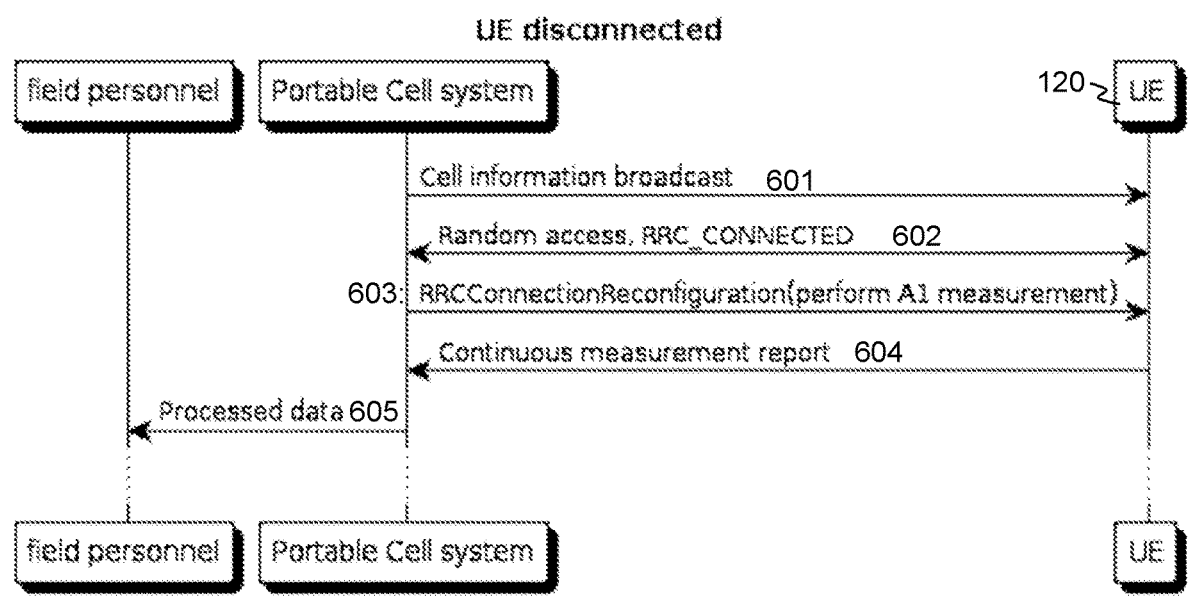
FIG. 6 is a schematic sequence diagram illustrating embodiments of a wireless communications network.
Figure 7:
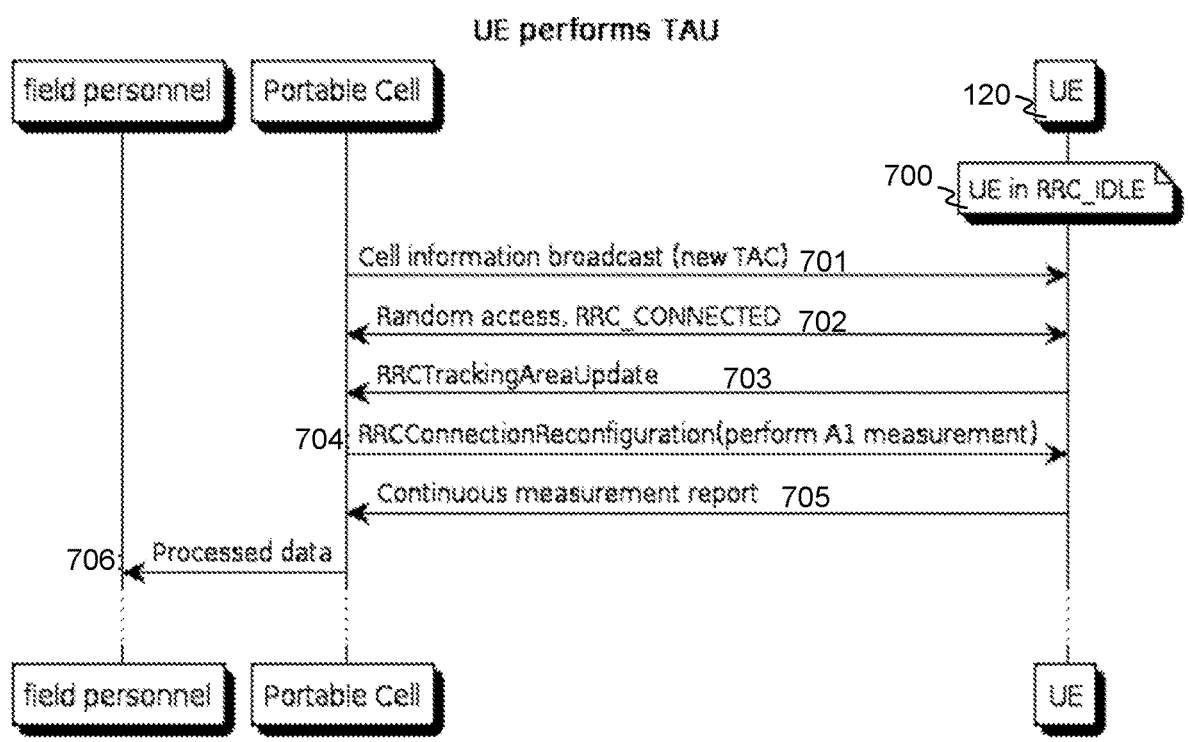
FIG. 7 is a schematic sequence diagram illustrating embodiments of a wireless communications network.
Figure 8:
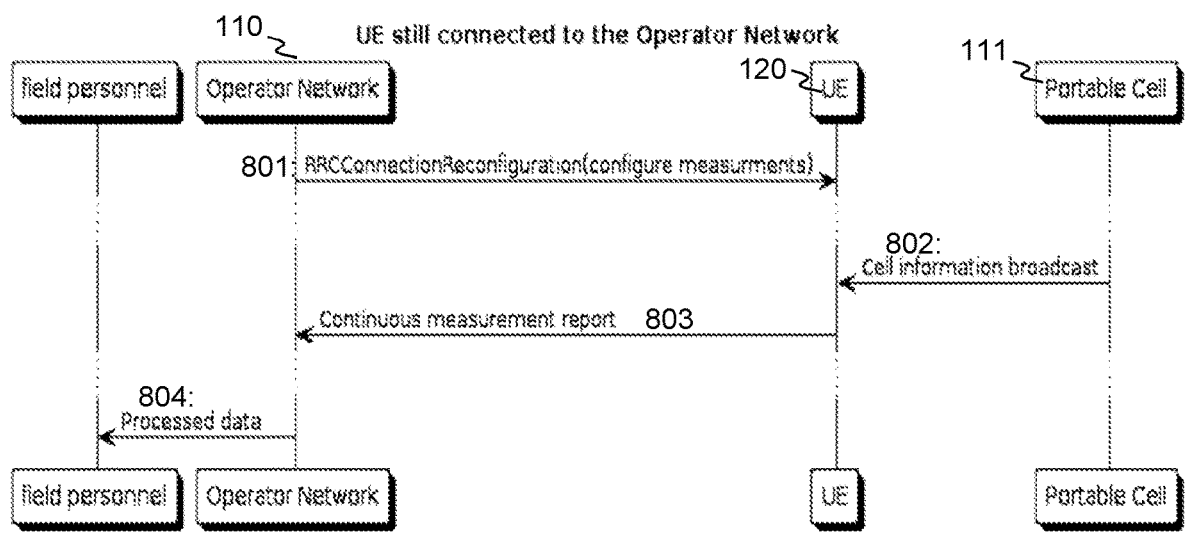
FIG. 8 is a schematic sequence diagram illustrating embodiments of a wireless communications network.

FIGS. 6, 7 and 8 disclose different example scenarios of embodiments herein.

In example scenarios of FIG. 6, the UE 120 is not registered in any network, e.g. since it is out of range or due to a frequency blocker. The portable network node 110, 111, referred to as the portable cell system in FIG. 6, broadcasts 601 reference signals and cell information of the cell provided by the portable network node 110, 111. Once the portable network node 110, 111, is in range, if the PLMN of the portable network node 110, 111, is not in a forbidden PLMN list in the UE 120, the UE 120 performs 602 an initial random access to the portable network node 110, 111. Once the UE 120 is in RRC connected mode, it receives 603 a RRC Reconfiguration message to perform measurements on the serving cell of the portable network node 110, 111.

The portable cell system such as the portable network node 110, 111 receives 604 the measurement reports from the UE 120 one by one during moving the portable network node 110, 111, processes the measurement data one by one, calculates and decides the moving direction step by step and presents 605 the respective processed data and moving direction one by one to the field personnel that controls the moving of the portable network node 110, 111 for moving it according to the decided moving direction step by step, e.g. network node 110, 111 is moved in the decided direction until next decided moving direction is received, it then start to moving according to the next decided moving direction. The processed data may e.g. be presented to the field personnel in a UE held by them e.g. by an indicator of direction, e.g. an arrow, a map indicating the estimated location as a position in the map, or as a probability e.g. heat map, or as a beep when coming closer. A heat map may be a graphical representation of data where individual values contained in a matrix are represented as colors.

In FIG. 7 the scenario is similar with the particularity that the UE 120 is in RRC idle mode 700 and by broadcasting 701 reference signals and a new cell with a new TAC the UE 120 is forced to connect to the portable network node 110, 111, referred to as the portable cell in FIG. 7, by performing 702 an initial random access to the portable network node 110, 111 and to perform 703 an Tracking Area Update procedure. Once in RRC connected mode continuous measurements is ordered in a RRC Reconfiguration message 704 and present the data to the field personnel.

The portable cell such as the portable network node 110, 111 receives the measurements, processes the measurement data, decides the moving direction and presents 706 the processed data to the field personnel controls the moving of the portable network node 110, 111.

In example scenarios of FIG. 8, the UE 120 remains connected to the operator network, e.g. comprising the network node 110, but the operator network such as the network node 110 configures 801 the UE 120 to perform measurements in the frequencies of the portable cell systems e.g. comprising the at least one portable network node 111, 112, 113. This measurement data will be reported 803 to the operator network such as the network node 110, who will forward 804 it to the field personnel, processed or not. If processed, the data may be further combined with LPP location data available to the operator.

Figure 9A:
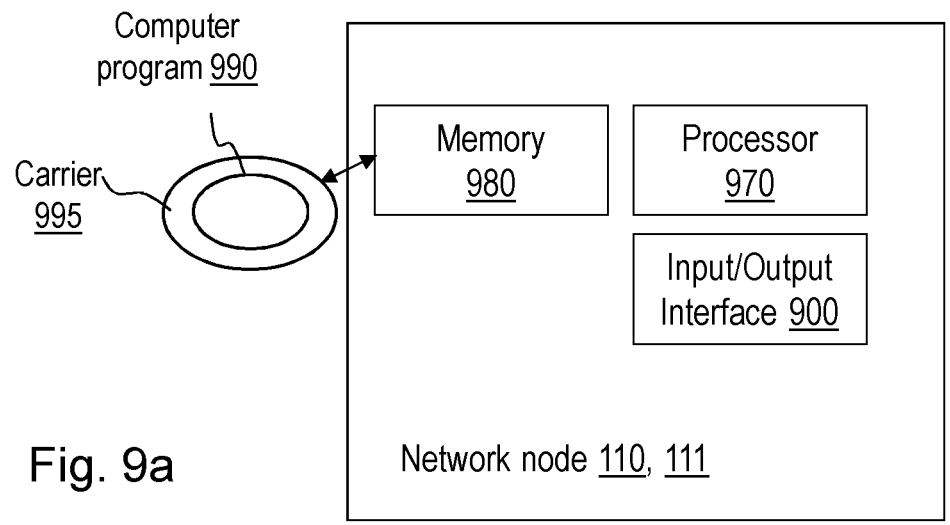
FIG. 9a-9b are schematic block diagrams illustrating embodiments of a wireless network node.
Figure 9B:
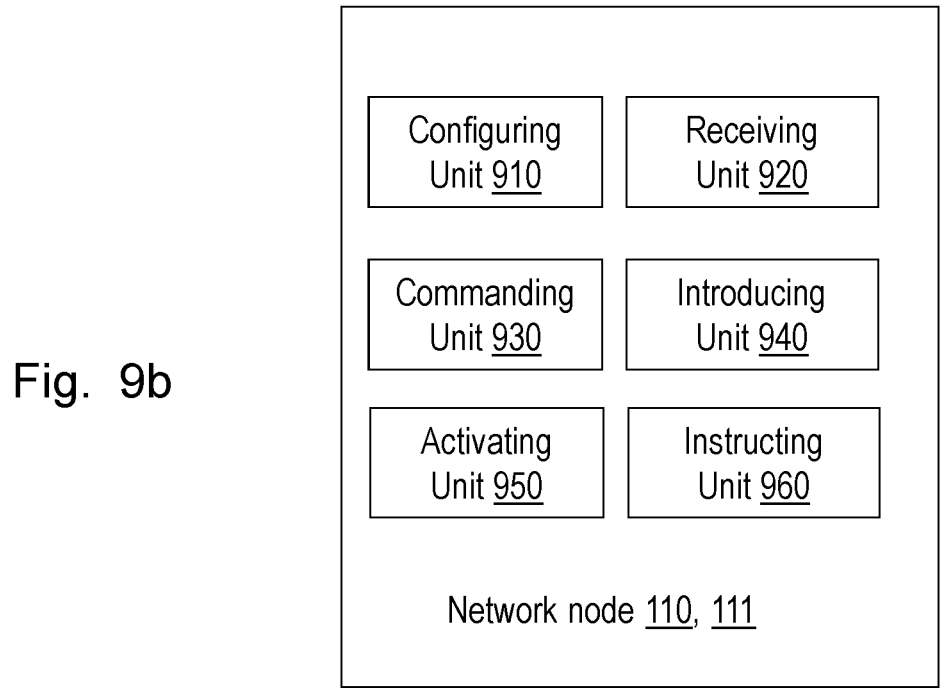

To perform the method actions for locating the UE 120, the network node 110 may comprise an arrangement depicted in FIGS. 9a and 9b. As mentioned above, the network node 110, 111, at least one portable network node 111, 112, 113 and the UE 120 are operable in a wireless communication network 100. The network node 110, 111 may be adapted to be collocated with one of the at least one portable network node 111, 112, 113.

The network node 110, 111, may comprise an input and output interface 900 configured to communicate with UEs such as the UE 120. The input and output interface may comprise a wireless receiver (not shown) and a wireless transmitter (not shown).

The network node 110, 111 is configured to, e.g. by means of a configuring unit 910 in the network node 110, 111, configure the at least one portable network node 111, 112, 113 to broadcast reference signals, triggering the UE 120 to subsequently measure and report the quality of the respective reference signals to the network node 110, 111.

The network node 110, 111 is further configured to, e.g. by means of a receiving unit 920 in the network node 110, 111, receive subsequent measurement reports from the UE 120. Each measurement report comprises a current quality value of the reference signals sent by the respective at least one portable network node 111, 112, 113.

The network node 110, 111 is further configured to, e.g. by means of a commanding unit 930 in the network node 110, 111, manage the respective at least one portable network node 111, 112, 113 to approach the position of the UE 120 by: meanwhile analyzing the subsequent measurement reports, command each of the at least one portable network node 111, 112, 113 to move in a direction that is decided based on the analysis of its corresponding subsequent measurement reports one by one upon receiving them. The moving direction is adapted to be to be performed such that quality values of its corresponding reference signals in subsequent measurement reports are increasing.

The moving direction of the respective at least one portable network node 111, 112, 113 may be adapted to be decided further based on information of current and previous positions of the UE 120.

The network node 110, 111 may further be configured to, e.g. by means of an introducing unit 940 in the network node 110, 111, when approaching the position of the UE 120 is required, introduce the at least one portable network node 111, 112, 113 to operate in the wireless communication network 100.

The network node 110, 111 may further be configured to, e.g. by means of the configuring unit 910 in the network node 110, 111, configure the UE 120 to any one or more out of: Measure on one or more frequencies related to the respective at least one portable network node 111, 112, 113, and report specific Physical Cell Identities, PCIs, for those respective one or more frequencies.

The specific PCIs may be adapted to be changed dynamically.

The network node 110, 111 may further be configured to, e.g. by means of an activating unit 950 in the network node 110, 111, activate a frequency blocker for blocking any frequency except the respective frequency of the broadcasted reference signals from each of the at least one portable network node 111, 112, 113.

The network node 110, 111 may further be configured to, e.g. by means of an instructing unit 960 in the network node 110, 111, instruct the of the at least one portable network node 111, 112, 113 to adapt their respective power to any one or more out of: facilitate for the UE 120 to send the measurement reports, and to mitigate interfere with the communications network 100.

The embodiments herein may be implemented through a respective processor or one or more processors, such as the processor 970 of a processing circuitry in the network node 110, 111, depicted in FIG. 11a, together with respective computer program code for performing the functions and actions of the embodiments herein. The program code mentioned above may also be provided as a computer program product, for instance in the form of a data carrier carrying computer program code for performing the embodiments herein when being loaded into the network node 110, 111. One such carrier may be in the form of a CD ROM disc. It is however feasible with other data carriers such as a memory stick. The computer program code may furthermore be provided as pure program code on a server and downloaded to the network node 110, 111.

The network node 110, 111 may further comprise a memory 980 comprising one or more memory units. The memory 980 comprises instructions executable by the processor in the network node 110, 111. The memory 980 is arranged to be used to store e.g. measurement reports, moving directions, data, configurations, and applications to perform the methods herein when being executed in the network node 110, 111.

In some embodiments, a respective computer program 990 comprises instructions, which when executed by the respective at least one processor 970, cause the at least one processor of the network node 110, 111 to perform the actions above.

In some embodiments, a respective carrier 995 comprises the respective computer program 990, wherein the carrier is one of an electronic signal, an optical signal, an electromagnetic signal, a magnetic signal, an electric signal, a radio signal, a microwave signal, or a computer-readable storage medium.

Those skilled in the art will appreciate that the units in the network node, 110, 111 described above may refer to a combination of analog and digital circuits, and/or one or more processors configured with software and/or firmware, e.g. stored in the network node, 110, 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 10A:
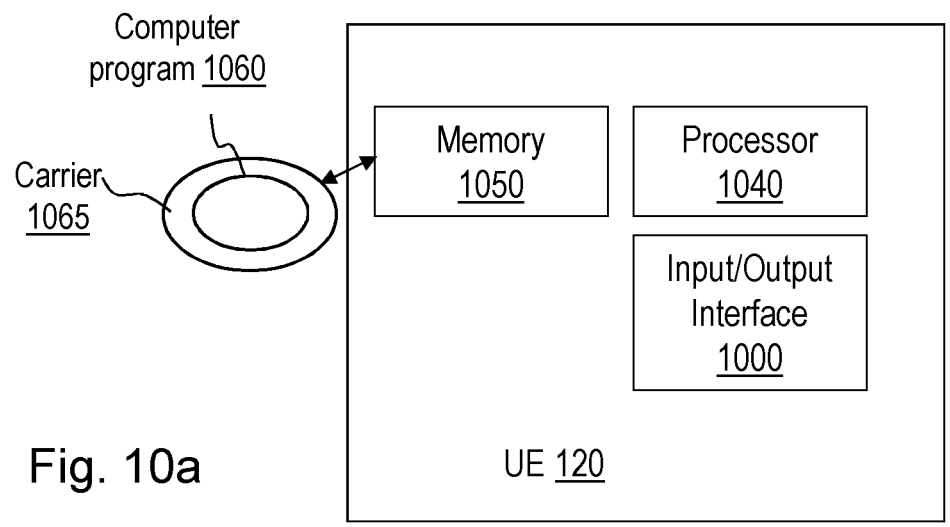
FIG. 10a-10b are schematic block diagrams illustrating embodiments of a UE.
Figure 10B:
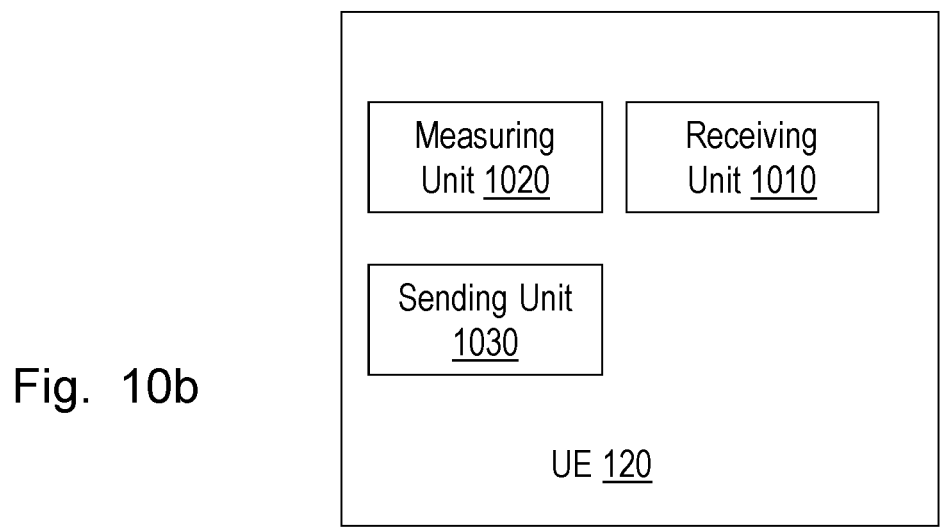

To perform the method actions for assisting a network node 110, 111 in locating the UE 120, the UE 120 may comprise an arrangement depicted in FIGS. 10a and 10b. As mentioned above, the UE 120, at least one portable network node 111, 112, 113 and the network node 110, 111 are operable in a wireless communication network 100.

The UE 120 may comprise an input and output interface 1000 configured to communicate with network nodes such as the network node 110, 111. The input and output interface may comprise a wireless receiver (not shown) and a wireless transmitter (not shown).

The UE 120 is configured to, e.g. by means of a receiving unit 1010 in the UE 120, receive broadcasted reference signals from the at least one portable network node 111, 112, 113, triggering the UE 120 to measure and report to the network node 110, 111, the quality of the reference signals sent by the respective at least one portable network node 111, 112, 113.

The UE 120 is further configured to, e.g. by means of a measuring unit 1020 in the UE 120, subsequently measure the quality of the respective reference signals.

The UE 120 is further configured to, e.g. by means of a sending unit 1030 in the UE 120, for each of the respective at least one portable network node 111, 112, 113, send respective subsequent measurement reports to the network node 110, 111, wherein each measurement report is adapted to comprise a current quality value of its reference signals. The subsequent measurement reports are adapted to assist the network node 110, 111 to command each of the respective at least one portable network node 111, 112, 113 to move in a direction such that quality values of its corresponding reference signals in the subsequent measurement reports are increasing.

The UE 120 may further be configured to, e.g. by means of the receiving unit 1010 in the UE 120, receive a configuration from the network node 110, 111, which configuration is adapted to configure the UE 120 to any one or more out of: Measure on one or more frequencies related to the respective at least one portable network node 111, 112, 113, and report a certain Physical Cell Identities, PCIs, for those respective one or more frequencies. E.g. both measure on one or more frequencies related to the respective at least one portable network node 111, 112, 113, and report a certain Physical Cell Identities, PCIs, for those respective one or more frequencies. The specific PCIs may be adapted to change dynamically.

The embodiments herein may be implemented through a respective processor or one or more processors, such as the processor 1040 of a processing circuitry in the UE 120 depicted in FIG. 10a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1050 comprising one or more memory units. The memory 1050 comprises instructions executable by the processor in UE 120. The memory 1050 is arranged to be used to store e.g. measurement reports, moving directions, data, configurations, and applications to perform the methods herein when being executed in the UE 120.

In some embodiments, a respective computer program 1060 comprises instructions, which when executed by the respective at least one processor 1040, cause the at least one processor of the UE 120 to perform the actions above.

In some embodiments, a respective carrier 1065 comprises the respective computer program 1060, wherein the carrier is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 11:
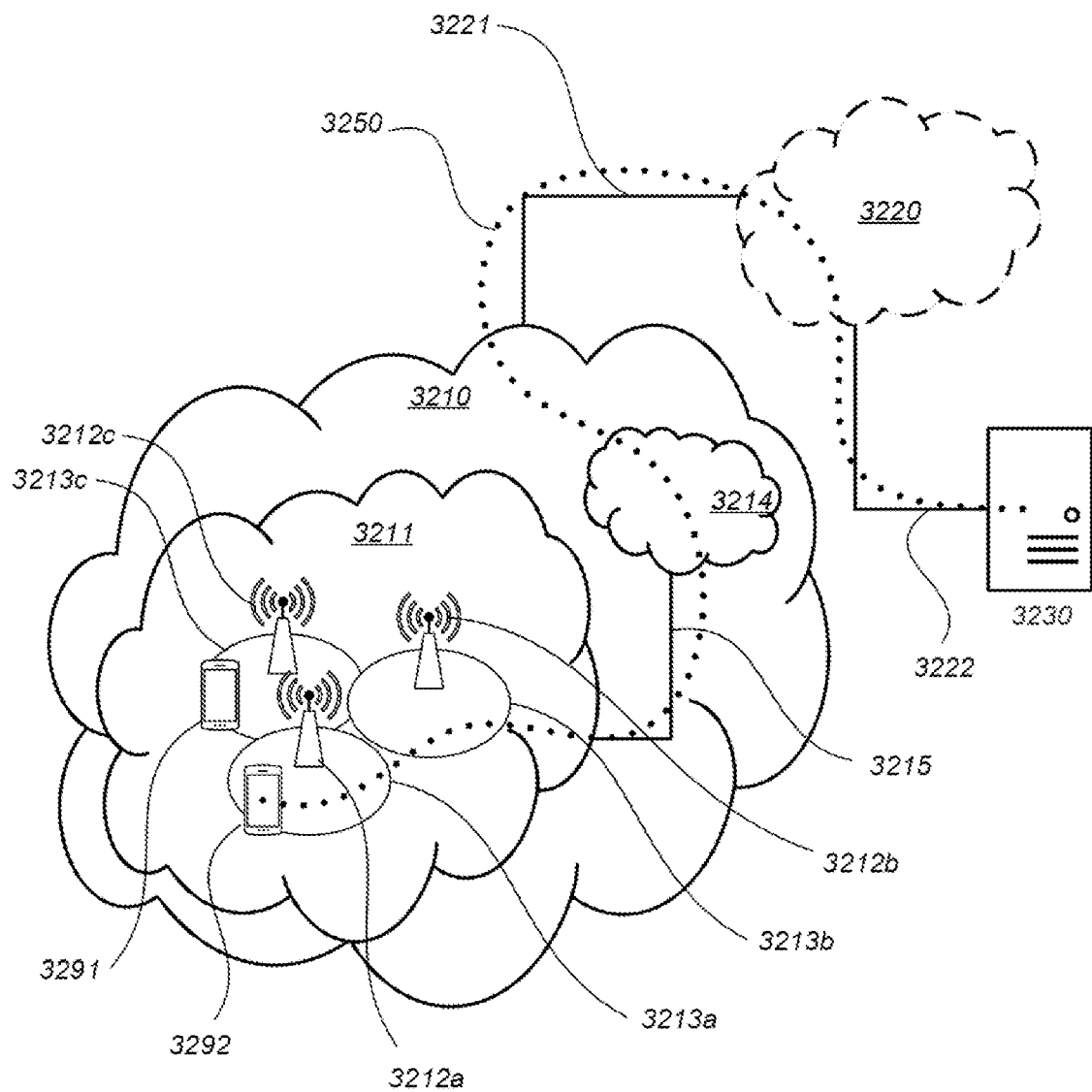
FIG. 11 schematically illustrates a telecommunication network connected via an intermediate network to a host computer.

With reference to FIG. 11, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 111, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
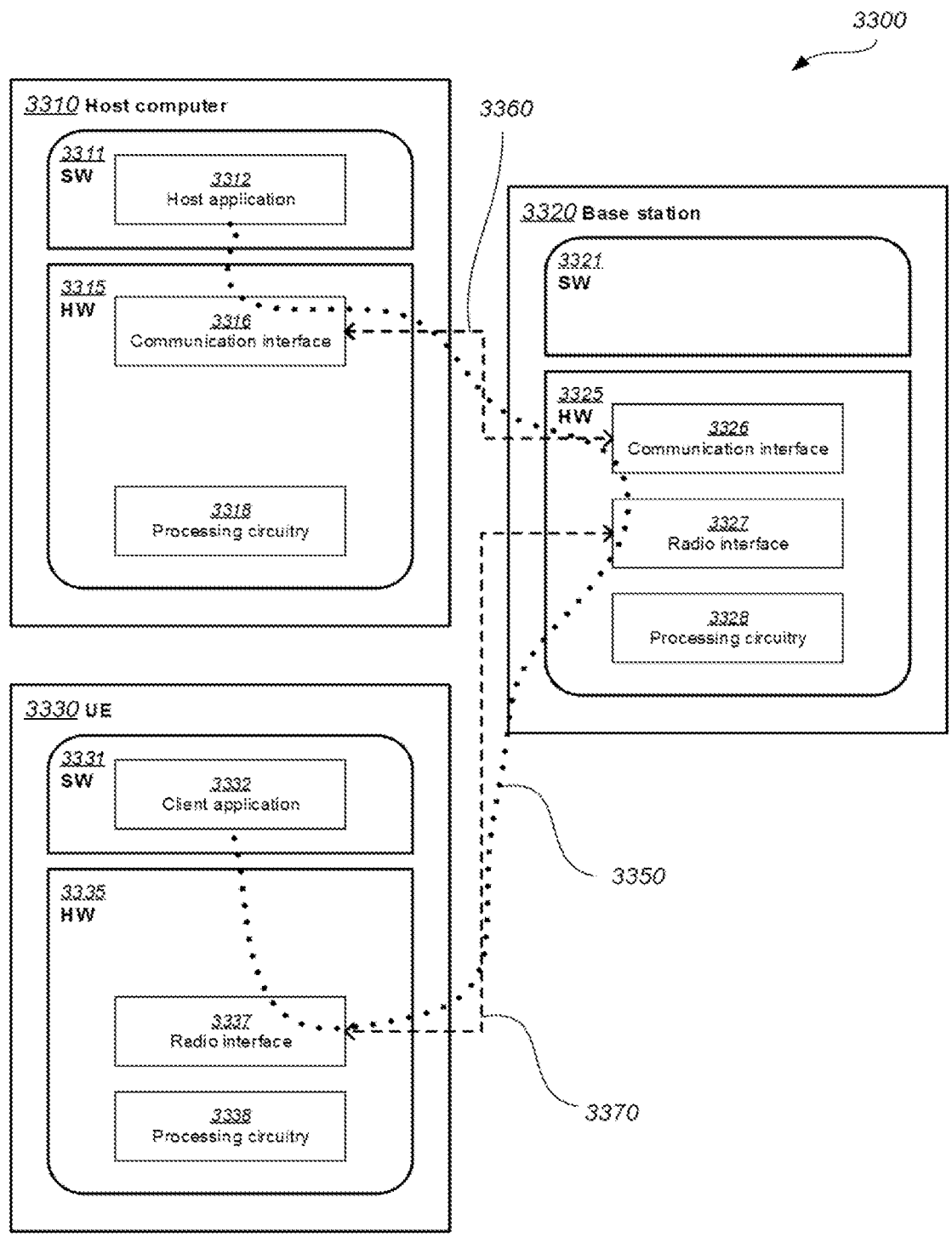
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 12, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 13, 14:
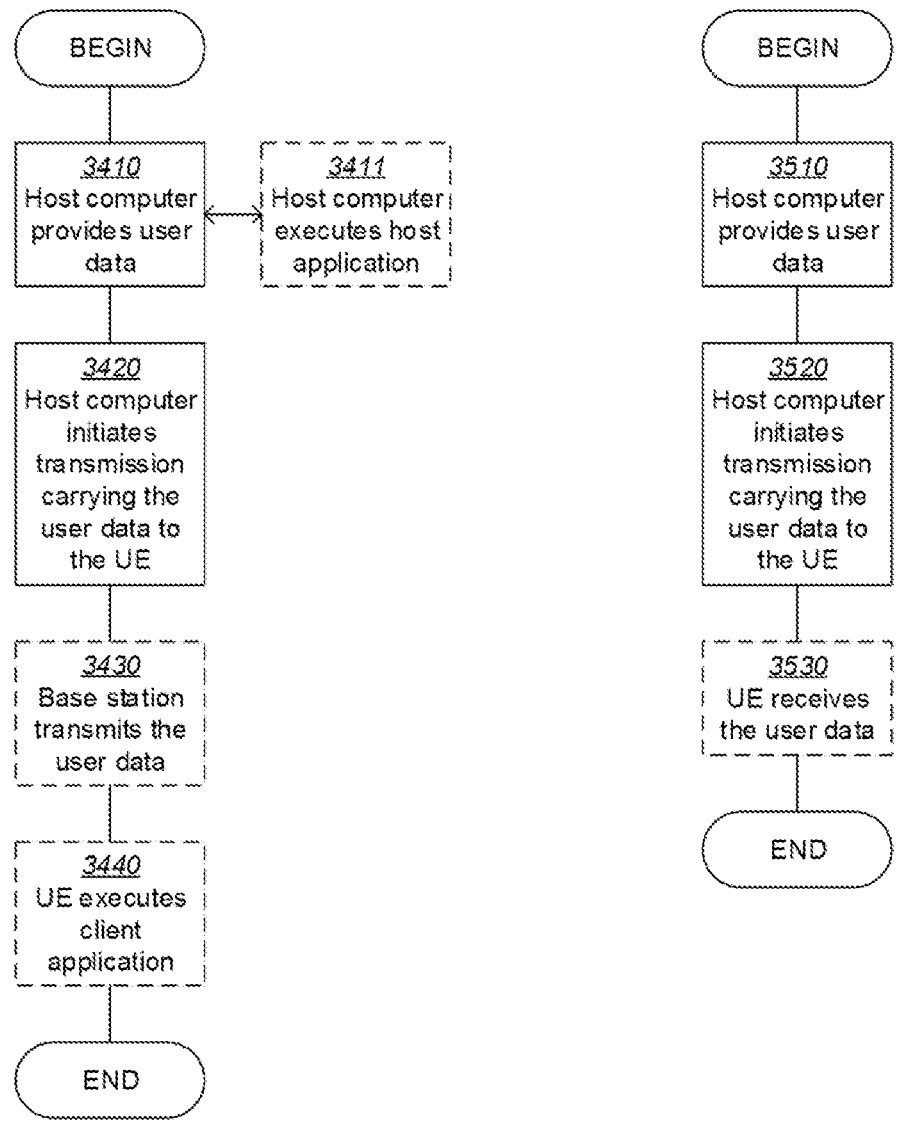

FIG. 13 is a flowchart illustrating a method implemented in a communication system, in accordance with one embodiment. The communication system includes a host computer, a base station such as the network node 110, and a UE such as the wireless device 120, which may be those described with reference to FIG. 11 and FIG. 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 11 and FIG. 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for locating a User Equipment, UE, wherein the network node, at least one portable network node and the UE operate in a wireless communication network, the method comprising:
    configuring the at least one portable network node to broadcast reference signals, triggering the UE to subsequently measure and report a quality of the respective broadcast reference signals to the network node,
    receiving subsequent measurement reports from the UE, wherein each measurement report comprises a current quality value of the reference signals sent by the respective at least one portable network node, and
    managing the respective at least one portable network node to approach the position of the UE by: meanwhile analysing the subsequent measurement reports, commanding each of the at least one portable network node to move in a direction that is decided based on the analysis of its corresponding subsequent measurement reports one by one upon receiving them, which moving direction is to be performed such that quality values of its corresponding reference signals in subsequent measurement reports are increasing.

2. The method according to claim 1, further comprising:
    when approaching the position of the UE is required, introducing the at least one portable network node to operate in the wireless communication network.

3. The method according to claim 1, further comprising:
configuring the UE to any one or more out of:
- measure on one or more frequencies related to the respective at least one portable network node, and
- report specific Physical Cell Identities, PCIs, for those respective one or more frequencies.

4. The method according to claim 3, wherein the specific PCIs changes dynamically.

5. The method according to claim 1, wherein the moving direction of the respective at least one portable network node is decided further based on information of current and previous positions of the UE.

6. The method according to claim 1, further comprising:
activating a frequency blocker for blocking any frequency except the respective frequency of the broadcasted reference signals from each of the at least one portable network node.

7. The method according to claim 1, further comprising:
instructing the at least one portable network node to adapt their respective power to any one or more out of:
facilitate for the UE to send the measurement reports and to mitigate interfere with the communications network.

8. The method according to claim 1, wherein the network node is collocated with one of the at least one portable network node.

9. A method performed by a User Equipment, UE, for assisting a network node in locating the UE, wherein the UE, at least one portable network node and the network node operate in a wireless communication network, the method comprising:
- receiving broadcasted reference signals from the at least one portable network node, triggering the UE to measure and report to the network node a quality of the reference signals broadcasted by the respective at least one portable network node,
- receiving a configuration from the network node, the configuration comprising an indication to report a physical cell identity (PCI) associated with each of the one or more broadcasted reference signals, wherein the PCI changes dynamically,
- subsequently measuring the quality of the respective reference signals, and
- for each of the respective at least one portable network node, sending respective subsequent measurement reports to the network node, wherein each measurement report comprises a current quality value of its reference signals, and
- which subsequent measurement reports assists the network node to command each of the respective at least one portable network node to move in a direction such that quality values of its corresponding reference signals in the subsequent measurement reports are increasing.

10. The method according to claim 9, further comprising:
receiving a configuration from the network node, wherein the configuration configures the UE to
measure on one or more frequencies related to the respective at least one portable network node.

11. A network node for locating a User Equipment, UE, wherein the network node, at least one portable network node and the UE are operable in a wireless communication network, the network node being configured to:
configure the at least one portable network node to broadcast reference signals, triggering the UE to subsequently measure and report a quality of the respective broadcast reference signals to the network node,
receive subsequent measurement reports from the UE, wherein each measurement report comprises a current quality value of the reference signals sent by the respective at least one portable network node, and
manage the respective at least one portable network node to approach the position of the UE by: meanwhile analysing the subsequent measurement reports, command each of the at least one portable network node to move in a direction that is decided based on the analysis of its corresponding subsequent measurement reports one by one upon receiving them, which moving direction is adapted to be to be performed such that quality values of its corresponding reference signals in subsequent measurement reports are increasing.

12. The network node according to claim 11, wherein the network node is further configured to, when approaching the position of the UE is required, introduce the at least one portable network node to operate in the wireless communication network.

13. The network node according to claim 11, wherein the network node is further configured to configure the UE to any one or more out of:
- measure on one or more frequencies related to the respective at least one portable network node, and
- report specific Physical Cell Identities, PCIs, for those respective one or more frequencies.

14. A User Equipment, UE, for assisting a network node in locating the UE, wherein the UE, at least one portable network node and the network node are operable in a wireless communication network, the UE being configured to:
- receive broadcasted reference signals from the at least one portable network node, triggering the UE to measure and report to the network node a quality of the reference signals broadcast by the respective at least one portable network node,
- receive a configuration from the network node, the configuration comprising an indication to report a physical cell identity (PCI) associated with each of the one or more broadcasted reference signals, wherein the PCI changes dynamically,
- subsequently measure the quality of the respective reference signals, and
- for each of the respective at least one portable network node, send respective subsequent measurement reports to the network node, wherein each measurement report is adapted to comprise a current quality value of its reference signals, and
- which subsequent measurement reports are adapted to assist the network node to command each of the respective at least one portable network node to move in a direction such that quality values of its corresponding reference signals in the subsequent measurement reports are increasing.

15. The UE according to claim 14, wherein said UE is further configured to receive a configuration from the network node, wherein the configuration configures the UE to measure on one or more frequencies related to the respective at least one portable network node.

* * * * *